US012652369B2

(12) United States Patent
Tuculescu et al.

(10) Patent No.: US 12,652,369 B2
(45) Date of Patent: Jun. 9, 2026

(54) AUTOMATIC ANSWERING FOR VIDEO CALLS ON TELEVISION

(71) Applicant: Onscreen, Inc., Yorba Linda, CA (US)

(72) Inventors: Costin Tuculescu, Tustin, CA (US);
Gerald Norton, Hoboken, NJ (US)

(73) Assignee: OnScreen Inc., Yorba Linda, CA (US)

( * ) Notice: Subject to any disclaimer, the term of this patent is extended or adjusted under 35 U.S.C. 154(b) by 149 days.

(21) Appl. No.: 18/658,875

(22) Filed: May 8, 2024

(65) Prior Publication Data

US 2024/0380863 A1      Nov. 14, 2024

Related U.S. Application Data

(60) Provisional application No. 63/464,846, filed on May 8, 2023.

(51) Int. Cl.
*H04N 7/14* (2006.01)
(52) U.S. Cl.
CPC ............. *H04N 7/142* (2013.01); *H04N 7/147* (2013.01)
(58) Field of Classification Search
CPC ................................ H04N 7/142; H04N 7/147
See application file for complete search history.

(56) References Cited

U.S. PATENT DOCUMENTS

| | | | | |
|---|---|---|---|---|
| 8,619,953 B2* | 12/2013 | Nietfeld | ................. | H04N 7/148 |
| | | | | 379/93.21 |
| 8,643,692 B2* | 2/2014 | Willis | .................... | H04N 7/173 |
| | | | | 709/201 |
| 8,643,694 B2* | 2/2014 | Xue | .................... | H04M 1/6505 |
| | | | | 348/14.06 |
| 8,897,757 B2* | 11/2014 | Epp | ......................... | H04M 1/64 |
| | | | | 455/414.1 |
| 8,994,881 B2* | 3/2015 | Shyu | ...................... | H04N 7/141 |
| | | | | 348/553 |
| 2003/0041333 A1* | 2/2003 | Allen | ................. | H04N 21/4622 |
| | | | | 348/E7.071 |
| 2023/0164199 A1* | 5/2023 | Kapinos | .................. | H04L 9/006 |
| | | | | 709/204 |
| 2024/0114110 A1* | 4/2024 | Yang | .................. | H04N 23/6812 |

* cited by examiner

*Primary Examiner* — Olisa Anwah
(74) *Attorney, Agent, or Firm* — PatentPC; Bao Tran

(57) ABSTRACT

The Automatic Answering for Video Calls on Television invention provides a user-friendly system for automatically answering incoming video calls on televisions, specifically designed for older adults, disabled individuals, and others with limited technical capabilities. The system ensures privacy by allowing only connected family members and friends to call the user. Upon answering the call, the system can turn on the television, switch inputs, and return to the previous input once the call has ended. This invention simplifies the video call experience and promotes accessibility using existing household technology.

20 Claims, 2 Drawing Sheets

System Overview

ONSCREEN Device

200

CPU (201)

Storage/RAM
(202)

Video Driver
HDMI
HDMI-CEC
(203)

Communication
Channels
(204)

Camera/
Microphones
(205)

Video Receiver
HDMI
HDMI-CEC
(206)

COMMUNICATION
BUS
(207)

AUTOMATIC ANSWERING FOR VIDEO CALLS ON TELEVISION

CROSS-REFERENCE TO RELATED APPLICATIONS

This application claims the benefit of U.S. Provisional Patent Application No. 63/464,846, filed on May 8, 2023, which is hereby incorporated by reference in its entirety.

PRIOR ART

U.S. Pat. No. 8,994,881 B2
Title: Method and Apparatus for Simultaneously Viewing Multimedia Content and Accepting an Incoming Video Call Communication
Inventors: Fang-Yuan Shyu
Publication Date: Mar. 31, 2015
Description: This patent discloses a method and apparatus for enabling users to simultaneously view multimedia content and accept incoming video calls on a television. The system leverages Picture-in-Picture (PIP) technology to manage and display both multimedia content and video call data on the same screen. It incorporates functionality for the television to automatically wake up from standby mode when an incoming call signal is detected, displaying the call information alongside or over the ongoing content using PIP. Users can interact with the system via a remote control, which allows them to accept or reject incoming calls. The television system is designed to integrate with broadband networks for both audio and visual communication, enhancing its utility for real-time communication.
Relevance: This patent describes integrating video calling with multimedia content viewing using network communication and PIP technology on televisions. While it offers a method for accepting video calls using a remote control, it does not provide automated answering capabilities for seniors or users that have technology challenges, nor specify the use of HDMI CEC standards for controlling TV power and input settings, nor does it detail hardware configurations involving HDMI IN and OUT ports for automatic source switching.
U.S. Pat. No. 8,619,953 B2
Title: Home Videoconferencing System
Inventors: Paul G. Nietfeld, Krishna Sai, Edward W. Brakus, Jr., Edward Gonen, Shai Toren, Boris Rakhlin
Publication Date: Dec. 31, 2013
Description: This patent describes a home videoconferencing system that interfaces with traditional set-top boxes and typical home A/V equipment. The system includes a camera, a microphone, and a codec module. The codec module can connect directly to a modem connected to a television network and can interface between the set-top box and the display. It supports bidirectional communication, compresses and decompresses video and audio signals for videoconferencing, and can be implemented with various modifications for handling different audio-visual inputs and outputs.
Relevance: While this patent outlines a system that integrates videoconferencing with traditional home entertainment setups, it primarily focuses on interoperability with standard home components and doesn't specify any kind of automatic answering function, which would make the solution simpler and easier for older adults.

FIELD OF THE INVENTION

The invention pertains to the field of telecommunications and more specifically to video call technology and television integration.

BACKGROUND OF THE INVENTION

In recent years, video calling has become an essential means of communication, enabling people to connect visually and audibly from anywhere. Televisions, as a central component of most households, provide an ideal platform for video calling. However, current video calling systems integrated with televisions often require manual intervention using remote controls, mobile apps, mobile devices, or speech technology to answer incoming calls. This can be particularly challenging for older adults, disabled individuals, or those with limited technical capabilities, resulting in a barrier to staying connected with loved ones.

The Automatic Answering for Video Calls on Television invention aims to make video calling technology more accessible and usable for older adults and others who may have difficulty with conventional methods of answering video calls. By implementing an automated answering system, this invention allows individuals of any age or ability to stay connected without the need for manual intervention.

SUMMARY OF THE INVENTION

The present invention relates to a system and method for facilitating video calls on a television, specifically designed to enhance accessibility and ease of use for individuals who may find traditional video calling interfaces challenging. The invention is particularly beneficial for older adults, disabled individuals, and those with limited technical skills.

The primary objective of this invention is to provide an automatic answering system for video calls that integrates seamlessly with television technology.

Key aspects of the invention include:

Automatic Activation: The system is capable of automatically answering incoming video calls without user intervention. This feature can be customized based on user preferences, which may include settings for specific callers, times of day, and days of the week.

User-Centric Customization: Users can set preferences for how calls are answered, including the option to have calls answered automatically or after a brief delay during which a visual and/or auditory alert may be presented. This allows users time to prepare for the incoming call if needed.

Hardware Integration: The invention includes a hardware component that connects to the television and the internet. This device controls the television's power state and input selection, ensuring that the television turns on and switches to the appropriate input when a call is incoming.

Privacy and Security: Calls can only be automatically answered from pre-approved contacts, ensuring that users' privacy is maintained. This system uses a cloud-based network to manage contact lists and settings, enhancing security by limiting access to authorized users only.

Seamless Transition Back: After a call has concluded, the system automatically returns the television to its previous state, whether that was turned off or set to a different input, reducing the need for manual handling and maintaining the natural usage patterns of the user.

The invention simplifies the process of receiving video calls on a television, making it more accessible and less intimidating for users who might otherwise be unable to take advantage of video calling technology. By automating the answering process and integrating deeply with television system controls, the invention ensures that users can effortlessly stay connected with their family and friends.

BRIEF DESCRIPTION OF THE DRAWINGS

The accompanying drawings, which are incorporated herein and form a part of the specification, illustrate various exemplary embodiments of the present invention and together with the description further serve to explain various principles and to enable a person skilled in the pertinent art to make and use the invention.

DETAILED DESCRIPTION OF THE PREFERRED EMBODIMENT OF THE INVENTION

Figure 1:
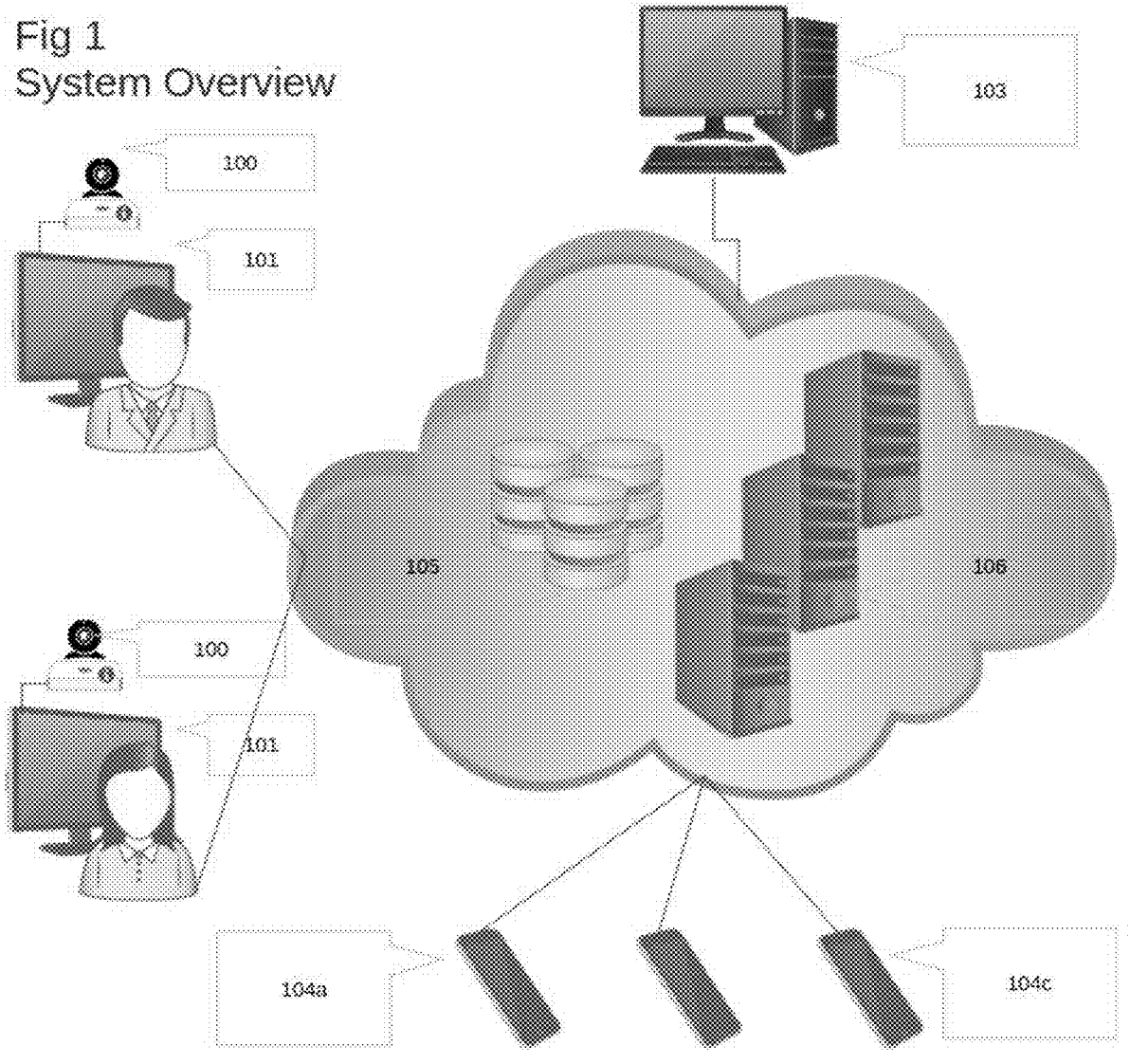
FIG. 1 is an overview of the components of one exemplary embodiment of the invention.
Figure 2:
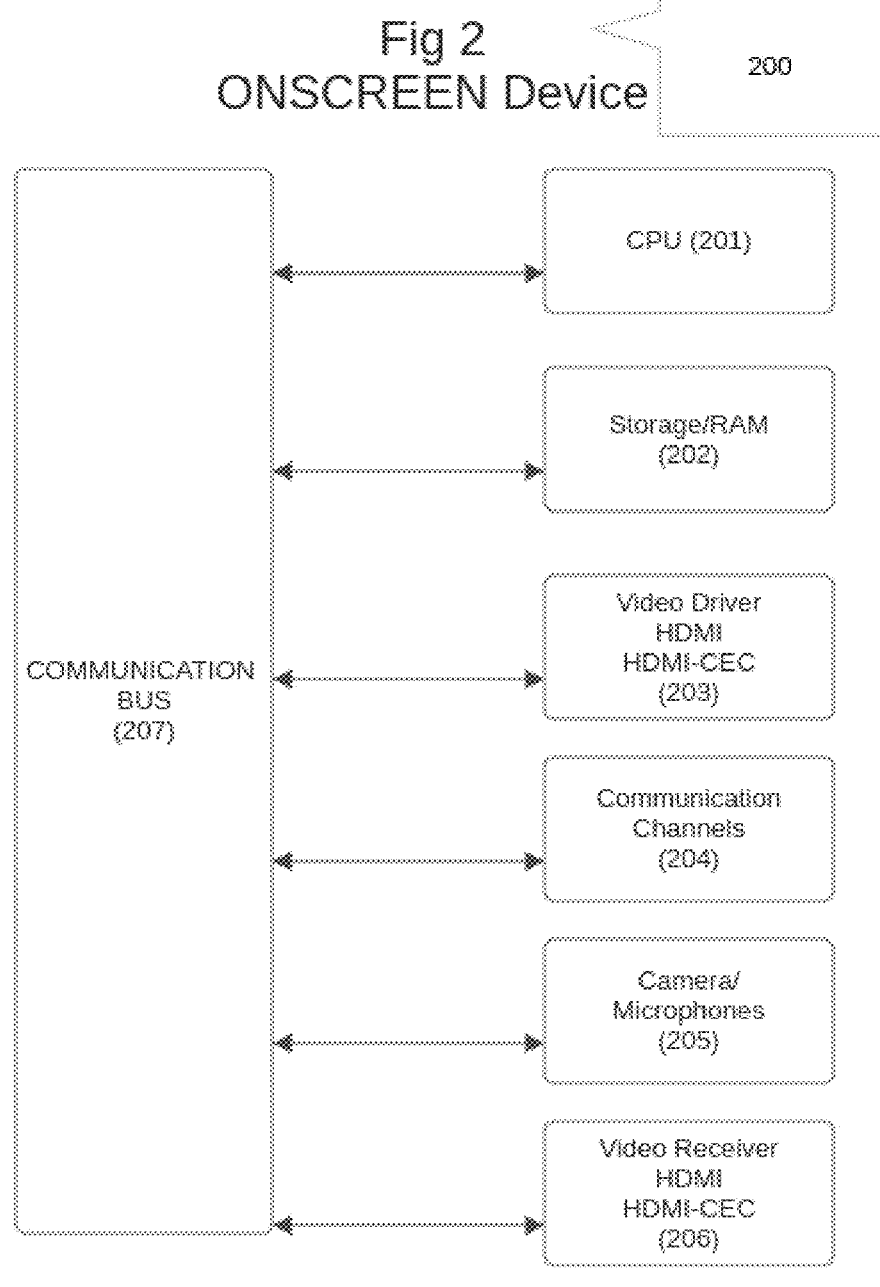
FIG. 2 is a block diagram illustrating the hardware component of one exemplary embodiment of the invention.

The invention pertains to a television-based video calling system designed to facilitate easier communication for users, particularly those who may have difficulty using traditional video calling technologies due to age, disability, or lack of technical familiarity. The system integrates a hardware device with a user's television and internet to manage incoming and outgoing video calls automatically based on user-defined settings.

System Components

Hardware Device (100): Description: A compact, connectable module that links directly to the television via HDMI ports and to the internet via Wi-Fi or Ethernet. This device is equipped with a processor, memory, and software necessary for handling video call operations and television control functions.

HDMI Ports: Features HDMI IN and HDMI OUT ports. The HDMI IN port connects to external sources like cable boxes or streaming devices, while the HDMI OUT port connects to the television. This configuration allows the device to seamlessly switch between regular TV content and video calls.

Functionality: Manages the television's power state and input selection through HDMI CEC standard commands, ensuring that the television automatically turns on and switches to the appropriate input when a call is incoming. While HDMI CEC commands also serve as a backup for switching sources, the primary mechanism is through direct control via the HDMI ports.

Cloud-Based Management System (105): Description: A secure, cloud-based platform where users can manage their settings and contact lists (Favorites). This system stores information about authorized callers and user preferences regarding how calls should be answered.

Functionality: It processes incoming calls to determine if they should be automatically answered based on the caller's authorization status and user preferences.

Operational Flow

Receiving a Call: When a call is incoming, the system first verifies the caller against the user's list of authorized contacts in the cloud-based management system.

If the caller is authorized, the hardware device activates, using HDMI CEC commands to power on the television if it is off and switch inputs to the HDMI port connected to the hardware device.

If the television is already on, or if the primary HDMI CEC input switch fails, the device will automatically switch the television's input from the HDMI IN source (e.g., cable box or streaming device) to the HDMI OUT source connected to the hardware device for the video call.

During the Call: The call is displayed on the television, utilizing the full screen for optimal visibility and interaction.

User interactions during the call (e.g., volume adjustments, ending the call) can be managed via a simple remote control interface designed for ease of use.

After the Call: Upon call termination, the system automatically switches the television back to the previous input source, whether it was a cable box, streaming device, or another HDMI source, using HDMI CEC commands or direct input toggling through the HDMI ports.

The invention claimed is:

1. A system for automatic answering of video calls using a television, the system comprising:

a video calling device, comprising a computing device, comprising a processor, memory, and software for controlling the television using a communications channel, a connected camera and a connected microphone; the communications channel for passing television operation instructions to control operation of the television; the connected camera for capturing images from an area near the television; the connected microphone for capturing audio from the area near the television; the video calling device connected to the television using the communication channel, the video calling device automatically answering incoming video calls without user intervention and customized based on user preferences with set preferences for call answering, including the option to have calls answered automatically or after a delay during which a visual or auditory alert is presented to allow time to prepare for the call, and settings for specific callers, times of day, and days of the week, wherein the device controls the television's power state and input selection to turn on the television and switch to a selected input when a call is incoming and after a call has concluded, automatically returns the television to a previous state;

a remote server for storing settings for the operation of the system, the remote server accessible by the video calling device to obtain settings instructions related to the operation of the video calling device; and wherein the computing device controls operation of the video calling device and the television to automatically answer a video call upon receipt.

2. The system of claim 1 wherein the settings instructions comprise an authorized caller list such that when the video call is received by the video calling device from a caller and when the caller appears on the authorized caller list, that call is automatically answered, and the video call begins without interaction from a recipient of the video call.

3. The system of claim 2 wherein the settings instructions further comprise a time-delay setting such that when the video call is to be answered, a previously-set time-delay elapses before the video call is enabled on the television and using the connected camera and connected microphone with set preferences for call answering, including the option to have calls answered automatically or after a delay during which a visual or auditory alert is presented to allow time to prepare for the call, and settings for specific callers, times of day, and days of the week.

4. The system of claim 2 wherein the settings instructions further comprise an alert setting such that when the video call is to be answered, a visual or auditory alert is provided to the recipient of the video call prior to any automatic answer.

5. The system of claim 1 wherein the settings instructions further comprise an authorized time period setting such that when a video call is received by the video calling device during a previously-set unavailable time period, the video call is ignored, but when the video call is received by the video calling device during a previously-set automatic-answer time period, the video call is automatically answered or presented for answer to the recipient of the video call.

6. The system of claim 1 wherein television operation instructions comprise instructions causing the television to power on, if not already powered on, and to transition to the communications channel connecting the video calling device to the television from an original communications channel upon detection of the video call.

7. The system of claim 6 wherein the television operation instructions further comprise instructions causing the television to transition to the original input/media channel upon termination of the video call and control the television's power state.

8. The system of claim 6 wherein the communications channel is a high-definition multimedia interface (HDMI) connecting the television to the video calling device and the television operation instructions are transmitted using the HDMI consumer electronics control (CEC) standard.

9. A video calling device for automatic answering of video calls using a television, the device comprising:

a computing device, comprising a processor, memory, and software for controlling the television using a communications channel, a connected camera and a connected microphone; the communications channel for passing television operation instructions from the video calling device to the television to control operation of the television; the connected camera for capturing images from an area near the television; the connected microphone for capturing audio from the area near the television;

the video calling device storing settings instructions to control operation of the video calling device; and wherein the computing device controls operation of the video calling device and the television to automatically answer a video call upon receipt with set preferences for call answering, including the option to have calls answered automatically or after a delay during which a visual or auditory alert is presented to allow time to prepare for the call, and settings for specific callers, times of day, and days of the week.

10. The video calling device of claim 9 wherein the settings instructions comprise an authorized caller list such that when a video call is received by the video calling device from a caller and when the caller appears on the authorized caller list, that call is automatically answered, and the video call begins without interaction from a recipient of the video call.

11. The video calling device of claim 10 wherein the settings instructions further comprise a time-delay setting such that when the video call is to be answered, a previously-set time-delay elapses before the video call is enabled on the television and using the connected camera and connected microphone.

12. The video calling device of claim 10 wherein the settings instructions further comprise an alert setting such that when the video call is to be answered, a visual or auditory alert is provided to the recipient of the video call prior to any automatic answer.

13. The video calling device of claim 9 wherein the settings instructions further comprise an authorized time period setting such that when a video call is received by the video calling device during a previously-set unavailable time period, the video call is ignored, but when the video call is received by the video calling device during a previously-set automatic-answer time period, the video call is automatically answered or presented for answer to the recipient of the video call.

14. The video calling device of claim 9 wherein television operation instructions comprise instructions causing the television to power on, if not already powered on, and to transition to the communications channel connecting the video calling device to the television from an original communications channel upon detection of the video call.

15. The video calling device of claim 14 wherein the television operation instructions further comprise instructions causing the television to transition to the original communications channel and control the television's power state.

16. The video calling device of claim 14 wherein the communications channel is a high-definition multimedia interface (HDMI) connecting the television to the video calling device and the television operation instructions are transmitted using the HDMI consumer electronics control (CEC) standard, further including an HDMI OUT port configured to connect to the television and an HDMI IN port configured to receive television content from an external source, and wherein the device is configured to selectively output, via the HDMI OUT port:

(i) television content received at the HDMI IN port without decoding, re-encoding, overlaying, or modifying the received television content; or (ii) video call content; and wherein the device stores settings instructions governing automatic answering behavior and transmits television operation instructions via the communications channel to control power state and input selection of the television.

17. A video calling device for automatic answering of video calls using a television, the device comprising:

a processor, a memory, and software for controlling the television using the according to settings instructions stored within the memory; a connected camera for capturing images from an area near the television;

a connected microphone for capturing audio from the area near the television; a communications channel for passing television operation instructions to the television control operation of the television; and the video calling device storing settings instructions to control operation of the video calling device to cause the video calling device to automatically answer a video call upon receipt;

when a call is incoming, a cloud-based system verifies the caller against a user's list of authorized contacts, wherein:

if the caller is authorized, the device powers on the television if the television is off and switches to a television port connected to the device;

if the television is on, the device automatically switches the television's input from a source to the television port connected to the device for the video call;

upon call termination, the device automatically switches the television back to the previous input source, commands or direct input toggling through the television ports.

18. The video calling device of claim 17 wherein the settings instructions cause the video calling device to instruct the television to power on and to transition from an original source channel to the communications channel upon receipt of the video call.

19. The video calling device of claim 18 wherein the settings instructions cause the video calling device to instruct the television to transition from the communications channel to the original source channel upon termination of the video call.

20. The video calling device of claim 17 wherein the settings instructions cause the video calling device to perform a selected one or more of the following: limit automatic answering of the video call to a predetermined list of authorized 'users; and limit automatic answering of the video call to a predetermined specified time periods.

\* \* \* \* \*